United States Patent [19]

Ruhlmann

[11] 4,348,318
[45] Sep. 7, 1982

[54] AZO-DYES, THEIR PREPARATION AND USE

[75] Inventor: Edmond Ruhlmann, Saint-Louis, France

[73] Assignee: Ciba-Geigy Corporation, Ardsley, N.Y.

[21] Appl. No.: 96,595

[22] Filed: Nov. 21, 1979

[30] Foreign Application Priority Data

Nov. 30, 1978 [CH] Switzerland ............... 12254/78

[51] Int. Cl.³ .................. C07C 107/04; C09B 62/085
[52] U.S. Cl. .............................. 260/153; 206/141; 206/162; 206/163
[58] Field of Search .............................. 260/153

[56] References Cited

U.S. PATENT DOCUMENTS

| 2,795,576 | 6/1957 | Fasciati | 260/153 |
| 2,891,940 | 6/1959 | Fasciati | 260/153 |
| 2,891,941 | 6/1959 | Fasciati et al. | 260/153 |
| 2,892,831 | 6/1959 | Stephen | 260/153 |
| 3,040,023 | 6/1962 | Fasciati et al. | 260/153 |
| 4,141,890 | 2/1979 | Hegar et al. | 260/153 |

FOREIGN PATENT DOCUMENTS

| 2817033 | 10/1979 | Fed. Rep. of Germany | 260/153 |
| 775308 | 5/1957 | United Kingdom | 260/153 |
| 2020681 | 11/1979 | United Kingdom | 260/153 |

Primary Examiner—Charles F. Warren
Attorney, Agent, or Firm—Edward McC. Roberts

[57] ABSTRACT

The invention relates to azo dyes of the formula

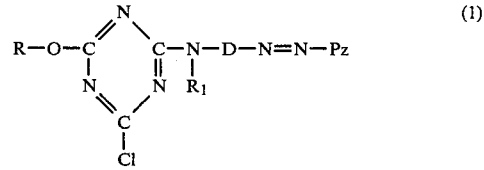

in which R is hydrogen, an alkyl radical having 1 to 6 carbon atoms, which can contain —O— and —S— members and can be further substituted, or a cycloalkyl radical, $R_1$ is hydrogen or $C_{1-4}$-alkyl, D is an aryl radical and Pz is a pyrazolone radical, the azo dye of the formula (1) containing one and not more than one strongly acid group conferring solubility in water, their preparation and their use for dyeing and printing textile material.

1 Claim, No Drawings

AZO-DYES, THEIR PREPARATION AND USE

The invention relates to novel azo dyes of the formula

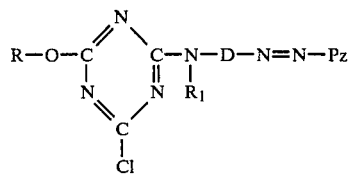

in which R is hydrogen, an alkyl radical having 1 to 6 carbon atoms, which can contain —O— and —S— members and can be further substituted, or a cycloalkyl radical, $R_1$ is hydrogen or $C_{1-4}$-alkyl, D is an aryl radical and Pz is a pyrazolone radical, the azo dye of the formula (1) containing one and not more than one strongly acid group conferring solubility in water.

An alkyl radical R can be straight-chain or branched. Further substituents on an alkyl radical R can be, for example: hydroxyl, carboxyl, chlorine, acetoxy, phenoxy, cyclohexyl, phenyl, hydroxyphenyl, methoxyphenyl, furyl and tetrahydrofuryl. If R is an alkyl radical and this contains —O— and —S—members, R is, for example, a 2-ethoxy-ethyl, 2-(2-methoxy-ethoxy)-ethyl or 2-ethylmercapto-ethyl radical. A cycloalkyl radical R is, for example, a cyclopentyl, cyclohexyl or methylcyclohexyl radical.

$C_{1-4}$-Alkyl $R_1$ can be: methyl, ethyl, propyl, isopropyl, butyl, isobutyl, sec.-butyl and tert.-butyl.

The aryl radical D is, for example, a benzene, naphthalene, diphenyl, diphenylmethane, diphenyl ether, diphenyl sulfide or diphenylsulfone radical. In addition to one of the strongly acid groups conferring solubility in water, which are mentioned below, the aryl radical D can contain further substituents, for example the following: alkyl groups having 1 to 4 carbon atoms, such as methyl, ethyl, propyl, isopropyl and butyl, alkoxy groups having 1 to 4 carbon atoms, such as methoxy, ethoxy, propoxy, isopropoxy and butoxy, alkanoylamino groups having 1 to 4 carbon atoms, such as acetylamino, benzoylamino, ureido, hydroxyl, phenoxy, alkoxycarbonyl groups having 1 to 4 carbon atoms, such as methoxycarbonyl and ethoxycarbonyl, carbamoyl, sulfamoyl, trifluoromethyl, cyano, nitro and halogen atoms, such as fluorine, chlorine and bromine.

The pyrazolone radical Pz is one of the known pyrazol-5-one-(4) radicals. This can be unsubstituted in the 1-position or can be substituted in the said position by an alkyl group, which is unbranched or branched and has 1 to 8 carbon atoms, or by a phenyl group or naphthyl group. Preferably, the pyrazolone radical Pz is substituted in the 1-position by a phenyl or naphthyl radical. In addition to one of the strongly acid groups conferring solubility in water, which are mentioned further below, the phenyl or naphthyl radical located in the 1-position of the pyrazolone radical Pz can contain further substituents, for example those mentioned as possible substituents, for example those mentioned as possible substituents of the aryl radical D.

The said pyrazolone radical can likewise be substituted in the 3-position, specifically, for example, by a methyl group, by a COOH group, a $CONH_2$ group or a COO-alkyl ester group, by the sulfomethyl group or by a $CONH_2$ group which is monosubstituted or disubstituted on the N atom by alkyl.

The strongly acid group conferring solubility in water in this case is, in particular, a sulfonic acid group, a carboxylic acid group or a phosphonic acid group. The strongly acid group conferring solubility in water, which is contained in the azo dyes of the formula (1), can be a substituent in R, D or Pz.

Preferred azo dyes are those of the formula

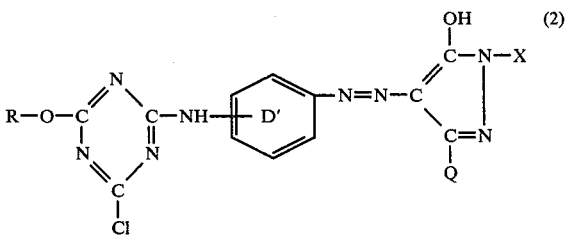

in which R is $C_{1-4}$-alkyl or $C_{1-4}$-alkoxyalkyl, Q is hydrogen, carboxyl, amino, carbamoyl or N-$C_{1-4}$-alkyl-carbamoyl and X is hydrogen or phenyl or naphthyl, which can be substituted by $C_{1-4}$-alkyl, $C_{1-4}$-alkoxy, halogen, carboxyl, sulfo, carbamoyl and sulfamoyl, and the benzene radical D' can be substituted by $C_{1-4}$-alkyl, $C_{1-4}$-alkoxy, halogen, nitro, acetylamino, ureido, hydroxyl, carboxyl, sulfo, carbamoyl and sulfamoyl, the azo dye of the formula (2) containing one and not more than one strongly acid group conferring solubility in water.

Particularly preferred azo dyes are those of the formula

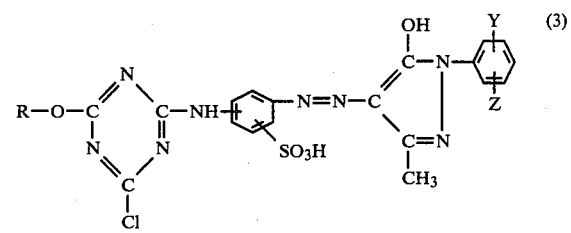

in which R is $C_{1-4}$-alkyl and Y and Z independently of one another are hydrogen, $C_{1-4}$-alkyl or halogen.

Valuable azo dyes are, for example:

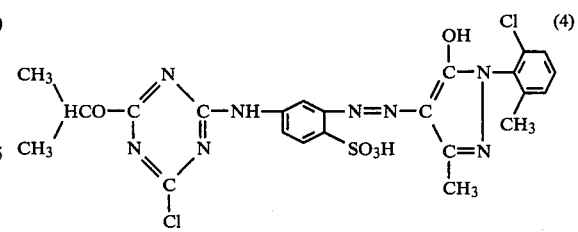

or

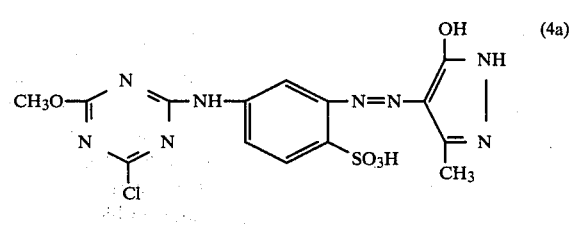

-continued
or

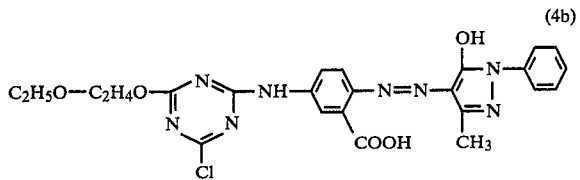
(4b)

The preparation of the azo dyes of the formula (1) comprises using dichloro-s-triazines of the formula

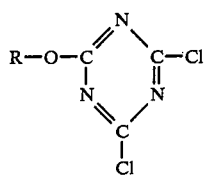
(5)

arylenediamines of the formula

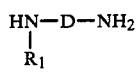
(6)

and pyrazolones of the formula

H—Pz   (7)

as the starting materials and subjecting these to condensation, diazotisation and coupling reactions, which reactions are carried out in any order except that coupling must follow diazotisation, the symbols R, $R_1$, D and Pz in the formulae (5) to (7) being as defined under formula (1) and the starting materials of the formulae (5) to (7) being so chosen that the resulting azo dyes of the formula (1) contain one and not more than one strongly acid group conferring solubility in water.

The preferred azo dyes of the formula (2) are prepared by using dichloro-s-triazines of the formula (5), phenylenediamines of the formula

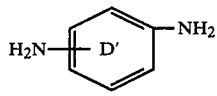
(8)

and pyrazolones of the formula

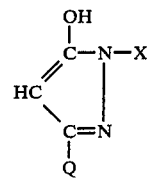
(9)

as the starting materials, the symbols R, D', Q and X in the formulae (5), (8) and (9) being as defined under formula (2) and the starting materials of the formulae (5), (8) and (9) being so chosen that the resulting azo dyes of the formula (2) contain one and not more than one strongly acid group conferring solubility in water.

The preparation of the particularly preferred azo dyes of the formula (3) comprises using dichloro-s-triazines of the formula (5), phenylenediaminesulfonic acid of the formula

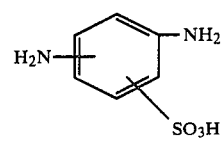
(10)

and pyrazolones of the formula

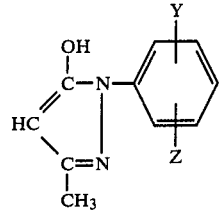
(11)

as the starting materials, the symbols R, Y and Z in the formulae (5) and (11) being as defined under formula (3).

Since the individual process steps mentioned above, i.e. condensation, diazotisation and coupling, can be carried out in various orders and, if desired, some of the steps can also be carried out at the same time, diverse process variants are possible. The starting materials to be used for each reaction step can be seen from formula (1). In general, the reaction is carried out in successive steps and the sequence of the simple reactions between the individual reactants of the formulae (5) to (7) or (5), (8) and (9) or (5), (10) and (11) can be freely chosen, except that coupling must follow diazotisation.

Important process variants comprise
1. subjecting a dichloro-s-triazine of the formula (5) to a condensation reaction with an arylenediamine of the formula (6), diazotising the resulting condensation product and coupling the diazo compound with a pyrazolone of the formula (7), or
2. diazotising an arylenediamine of the formula (6) and coupling the diazo compound with a pyrazolone of the formula (7) and subjecting the resulting azo compound to a condensation reaction with a dichloro-s-triazine of the formula (5).

The process variants mentioned can also be carried out when reactants of the formulae (5), (8) and (9) or (5), (10) and (11) are used as the starting materials.

The preferred procedure for preparation of the azo dyes of the formulae (4), (4a) and (4b) comprises subjecting 2-isopropoxy-4,6-dichloro-s-triazine to a condensation reaction with 1,3-phenylenediamine-4-sulfonic acid, diazotising the resulting condensation product and coupling the diazo compound with 1-(2'-chloro-6'-methylphenyl)-3-methyl-5-pyrazolone, or subjecting 2-methoxy-4,6-dichloro-s-triazine to a condensation reaction with 1,3-phenylenediamine-4-sulfonic acid, diazotising the resulting condensation product and coupling the diazo compound with 3-methyl-5-pyrazolone, or subjecting 2-(2-ethoxy-ethoxy)-4,6-dichloro-s-triazine to a condensation reaction with 2,5-diaminobenzoic acid, diazotising the resulting condensation product and coupling the diazo compound with 1-phenyl-3-methyl-5-pyrazolone.

The diazotisation of the arylenediamines of the formula (6) [or (8) or (10)] is as a rule effected by the action of nitrous acid in aqueous/mineral acid solution at low temperature and the coupling reaction with the pyrazolones of the formula (7) [or (9) or (11)] is as a rule effected at weakly acid or neutral to weakly alkaline pH values.

The condensation reactions of the dichloro-s-triazines of the formula (5) with the arylenediamines of the formula (6) [or (8) or (10)] are preferably carried out in aqueous solution or suspension at low temperature and at a weakly acid or neutral to weakly alkaline pH value. Advantageously, the hydrogen chloride liberated during the condensation reaction is continuously neutralised by the addition of aqueous alkali metal hydroxides, alkali metal carbonates or alkali metal bicarbonates.

In some cases, for coupling reactions in which a diaminobenzenesulfonic acid is used as the diazo component of the formula (6), it is advantageous not to use the acid itself but, instead of this, to use an aminoacylaminobenzenesulfonic acid, for example 5-acetylamino-aniline-2-sulfonic acid, from which the acetyl group is detached by saponification after the coupling reaction has gone to completion and before the further condensation reaction is carried out. Furthermore, it is also possible to use a nitro-amino compound, for example 5-nitro-aniline-2-sulfonic acid, as the diazo component of the formula (6) and, after the coupling reaction, to reduce the nitro group to the amino group using sodium sulfide or sodium hydrosulfide.

Dichloro-s-triazines of the formula (5) are known. They are prepared by subjecting 2,4,6-trichloro-s-triazine (cyanuric chloride) to a condensation reaction in a molar ratio of 1:1 with alcohols of the formula

R—OH     (12)

in which R is as defined under the formulae (1) to (3). Like the condensation reaction of the dichloro-s-triazines of the formula (5) with the arylenediamines of the formula (6), the condensation reaction is preferably carried out in aqueous solution or suspension, at low temperature and at a weakly acid or neutral to weakly alkaline pH value and in the presence of an agent which detaches hydrogen chloride.

Examples of starting materials for the preparation of the azo dyes of the formula (1) are:

Dichloro-s-triazines of the formula (5)

4,6-Dichloro-2-methoxy-, -2-ethoxy-, -2-propoxy-, -2-butoxy-, -2-(2-methyl-propoxy)-, -2-pentyloxy-, -2-(3-methyl-butoxy)-, -2-(2-methyl-butoxy)-, -2-hexyloxy-, -2-(2-chloroethoxy)-, -2-(3-chloropropoxy)-, -2-(2-methoxyethoxy)-, -2-(2-ethoxy-ethoxy)-, -2-(2-butoxy-ethoxy)-, -2-(3-methoxy-butoxy)-, -2-[2-(2-methoxyethoxy)-ethoxy]-, -2-(2-ethoxy-ethoxymethoxy)-, -2-(2-ethylmercapto-ethoxy)-, -2-(2-phenoxyethoxy)-, -2-cyclohexyl-methoxy-, -2-(2-acetoxy-ethoxy)-, -2-carboxymethoxy-, -2-(1-methylethoxy)-, -2-(1-methyl-propoxy)-, -2-(1-methyl-pentyloxy)-, -2-(1,2-dimethyl-propoxy)-, -2-cyclopentyloxy-, -2-cyclohexyloxy-, -2-(2-methyl-cyclohexyloxy)-, -2-benzyloxy-, -2-(2-hydroxy-benzyloxy)-, -2-(4-methoxy-benzyloxy)-, -2-phenethoxy-, -2-(2-hydroxyethoxy)-, -2-tert.-butoxy-, -2-(3-methoxy-propoxy)-, -2-(3-ethoxy-propoxy)-, -2-[2-(2-ethoxy]-ethoxy-propoxy)-, -2-[2-(2-ethoxy-ethoxy)-ethoxy]- and -2-hydroxy-s-triazine.

Arylenediamines of the formula (6) [or (8) or (10)]

1,3- and 1,4-Diaminobenzene, 1,3-diamino-4-methylbenzene, 1,4-diamino-2-methylbenzene, 1,3-diamino-4-methoxybenzene, 1,4-diamino-2-methoxybenzene, 1,3-diamino-4-chlorobenzene, 1,3-diamino-4-ethylbenzene, 1,3-diamino-4-ethoxybenzene, 1,3-diaminobenzene-4-sulfonic acid, 1,4-diaminobenzene-2-sulfonic acid, 1,3-diamino-4-methylbenzene-6-sulfonic acid, 1-amino-3-acetylaminobenzene-4-sulfonic acid (saponified), 1-amino-4-acetylaminobenzene-2-sulfonic acid (saponified), 1-amino-3-acetylamino-6-methylbenzene-4-sulfonic acid (saponified), 1-amino-3-acetylamino-6-methoxybenzene-4-sulfonic acid (saponified), 1,3-diamino-6-methylbenzene-4-sulfonic acid, 1,4-diamino-6-chlorobenzene-2-sulfonic acid, 1-amino-3-acetylaminobenzene (saponified), 1-amino-3-acetylaminobenzene-5- or -6-sulfonic acid (saponified), 1-amino-4-acetylaminobenzene-2-sulfonic acid (saponified), 1-amino-3-(N-acetyl-N-methylamino)-benzene (saponified), 3- or 4-nitroaniline (reduced), 2-methoxy-4- or -5-nitroaniline (reduced), 2-methoxy-3-nitro-5-methylaniline (reduced) and 2-methoxy-3-nitro-5-chloroaniline, 1-amino-4-acetylaminobenzene (saponified), 1-amino-3-acetylamino-4-methylbenzene-6-sulfonic acid (saponified), 1-amino-4-nitrobenzene-2-sulfonic acid (reduced), 1-amino-2-hydroxy-6-nitronaphthalene-4-sulfonic acid (reduced), 1,5-diaminonaphthalene, 4-acetylamino-2-aminophenol-6-sulfonic acid (saponified), 6-nitro-2-aminophenol-4-sulfonic acid (reduced), 6-acetylamino-2-aminophenol-4-sulfonic acid (saponified), 4-nitro-2-aminophenol-6-sulfonic acid (reduced), 6-acetylamino-1-amino-2-naphthol-4-sulfonic acid (saponified), 1-amino-4-methoxy-5-aminomethyl-benzene-6-sulfonic acid, 4,4'-diaminodiphenylmethane, 4,4'-dimethyl-3,3'-diamino-diphenylmethane, 4,4'-diamino-diphenyl (benzidine), 4,4'- or 2,4'-diaminodiphenyl ether, 4,4'-dichloro-2,2'-diaminodiphenyl ether, 4,4'- or 2,2'-diaminodiphenyl sulfide, 2,4'- or 3,3'-diamino-diphenylsulfone, 2,4-diamino-benzoic acid, 2,5-diamino-benzoic acid, 4,4'-diamino-diphenyl oxide, 2,6-diaminonaphthalene, 1,3-diamino-2,4,6-trimethyl-benzene, 1,4-diamino-2,3,5,6-tetramethylbenzene, 1,3-diamino-4-nitrobenzene, 4,4'-diaminostilbene, 3,3'-dimethylbenzidine, 3,3'-dimethoxybenzidine, 3,3'-dichlorobenzidine, 2,2'-dimethylbenzidine and 4,2'-diaminodiphenyl (diphenyline).

Pyrazolones of the formula (7) [or (9) and (11)]

3-Methyl-5-pyrazolone, 5-pyrazolone-3-carboxylic acid, 1-phenyl-3-methyl-5-pyrazolone, 1-phenyl-5-pyrazolone-3-carboxylic acid, 1-phenyl-3-sulfomethyl-5-pyrazolone, 1-(2'-sulfophenyl)-3-methyl-5-pyrazolone, 1-(4'-sulfophenyl)-3-methyl-5-pyrazolone, 1-(3'-sulfophenyl)-3-methyl-5-pyrazolone, 1-(2'- or 3'- or 4'-chlorophenyl)-3-methyl-5-pyrazolone, 1-(2'-chloro-4'-sulfophenyl)-3-methyl-5-pyrazolone, 1-(2'-chloro-5'-sulfophenyl)-3-methyl-5-pyrazolone, 1-(2'-sulfo-4'-chlorophenyl)-3-methyl-5-pyrazolone, 1-(2',5'-dichloro-4'-sulfophenyl)-3-methyl-5-pyrazolone, 1-(2'-methyl-4'-sulfophenyl)-3-methyl-5-pyrazolone, 1-(2'-methylphenyl)-5-pyrazolone-3-carboxylic acid, 1-(6'-chloro-2'-methyl-4'-sulfophenyl)-3-methyl-5-pyrazolone, 5-pyrazolone-3-carboxylic acid butylamide, 3-phenyl-5-pyrazolone, 3-(2'-chlorophenyl)-5-pyrazolone, 1-(3'-chlorophenyl)-5-pyrazolone-3-carboxylic acid, 1-phenyl-3-methyl-5-pyrazolone-3'-sulfonamide, 1-n-octyl-3-methyl-5-pyrazolone, 1,3-diphenyl-5-pyrazolone, 1-(2',5'-dichlorophenyl)-3-methyl-5-pyrazolone, 1-(2'-methylphenyl)-3-methyl-5-pyrazolone, 1-(2'-ethylphenyl)-3-methyl-5-pyrazolone, 1-(2'-methyl-6'-chlorophenyl)-3-methyl-5-pyrazolone, 1-(2'-methyl-6'-ethylphenyl)-3-methyl-5-pyrazolone, 1-naphthyl[2']-3-methyl-5-pyrazolone, 1-naphthyl[2']-5-pyrazolone-3-carboxylic acid and 1-(5'- or 6'-sulfonaphthyl[2'])-3-methyl-5-pyrazolone.

The azo dyes of the formula (1) can be isolated and processed to usable, dry dyeing preparations. Isolation is preferably effected at temperatures which are as low as possible, by salting out and filtering. The dyes filtered off can be dried, if desired after adding extenders and/or buffers, for example after adding a mixture of equal parts of mono- and di-sodium phosphate; preferably, drying is carried out at temperatures which are not too high and under reduced pressure. In certain cases the dry preparations according to the invention can be obtained direct, i.e. without intermediate isolation of the dyes, by spray-drying the entire mixture from the preparation.

The azo dyes of the formula (1) are novel. They give dyeings with good wet fastness properties and good fastness to light. It should be emphasised in particular that the dyes display good solubility and electrolyte solubility coupled with good exhaustion characteristics and high fixation of the dye and that the portions which are not fixed can be removed easily. The dyeings are dischargeable.

The azo dyes of the formula (1) are suitable for dyeing and printing very diverse materials, but especially silk, wool and high molecular weight polyamide fibres. They are suitable both for the exhaustion process and for dyeing by the pad dyeing process, according to which the goods are impregnated with aqueous dye solutions, which can also contain salts.

They are also suitable for printing nitrogen-containing fibres, for example wool or mixed fabrics containing silk or wool.

It is advisable to subject the dyeings and prints to thorough rinsing with cold and hot water, if desired with the addition of an agent which has a dispersant action and promotes diffusion of the non-fixed portions of the dye.

In the following examples parts are by weight and the temperatures are in degrees centigrade.

EXAMPLE 1

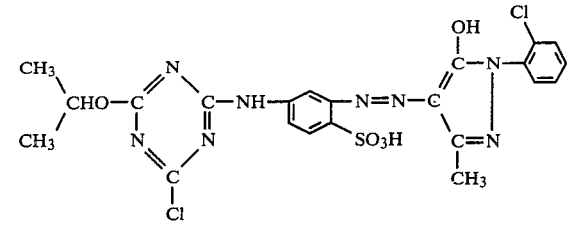

24 parts of 2-isopropoxy-4,6-dichloro-s-triazine are added in the course of ½ hour, at 10° to 20° C., to a neutral solution of 18.8 parts of 1,3-phenylenediamine-4-sulfonic acid, the pH value being kept at 6 to 7.5 by the dropwise addition of 30% sodium hydroxide solution. After diluting to 500 parts by volume, the resulting solution of the reaction product is acidified with 25 parts of 30% hydrochloric acid and diazotised with 24 parts by volume of 4 N Na nitrite solution. A solution of 18.9 parts of 1-(2'-chlorophenyl)-3-methyl-5-pyrazolone in 200 parts by volume of 0.5 N sodium hydroxide solution is added gradually, at 10° to 15° C., to the resulting slightly yellowish coloured diazo suspension. The reaction mixture is stirred for 5 hours at 10° to 15° C. and pH 7.0. The resulting dye is then precipitated with sodium chloride, filtered off and dried in vacuo. The dye dyes wool and fibres made of polyamide in greenish-tinged yellow shades.

When the above example is repeated using equivalent amounts of 2-methoxy- or 2-(2-ethoxy-ethoxy)-4,6-dichloro-s-triazine instead of 2-isopropoxy-4,6-dichloro-s-triazine, dyes with similar properties are obtained.

Further azo dyes, which dye wool and polyamide fibres in yellow shades, are obtained when the dichloro-s-triazines in column I of the following table are subjected, in accordance with the instructions of Example 1, to a condensation reaction with 1,3-phenylenediamine-4-sulfonic acid and the resulting condensation products are coupled with the pyrazolones of column II.

TABLE 1

| | I<br>Dichloro-s-triazines | II<br>Pyrazolones |
|---|---|---|
| 1 | 2-Methoxy-4,6-dichloro-s-triazine | 3-Methyl-5-pyrazolone |
| 2 | 2-Ethoxy-4,6-dichloro-s-triazine | 1-Phenyl-3-methyl-5-pyrazolone |
| 3 | 2-Propoxy-4,6-dichloro-s-triazine | 1-(2',6'-Dimethylphenyl)-3-methyl-5-pyrazolone |
| 4 | 2-Isopropoxy-4,6-dichloro-s-triazine | 3-Methyl-5-pyrazolone |
| 5 | 2-(2-Ethoxy-ethoxy)-4,6-dichloro-s-triazine | 1-(3'-Chlorophenyl)-3-methyl-5-pyrazolone |
| 6 | 2-Methoxy-4,6-dichloro-s-triazine | 1-Phenyl-3-methyl-5-pyrazolone |
| 7 | 2-Butoxy-4,6-dichloro-s-triazine | 1-(2'-Methylphenyl)-3-methyl-5-pyrazolone |
| 8 | 2-Isopropoxy-4,6-dichloro-s-triazine | 1-Phenyl-3-methyl-5-pyrazolone |
| 9 | 2-Benzyloxy-4,6-dichloro-s-triazine | 1-(2'-Chloro-6'-methylphenyl)-3-methyl-5-pyrazolone |
| 10 | 2-(2-Ethoxy-ethoxy)-4,6-dichloro-s-triazine | 1-Phenyl-3-methyl-5-pyrazolone |
| 11 | 2-Isopropoxy-4,6-dichloro-s-triazine | 1-(2'-Chloro-6'-methylphenyl)-3-methyl-5-pyrazolone |
| 12 | 2-(2-Ethoxy-ethoxy)-4,6-dichloro-s-triazine | 3-Methyl-5-pyrazolone |
| 13 | 2-(2-Methoxy-ethoxy)-4,6-dichloro-s-triazine | 1-Ethyl-3-methyl-5-pyrazolone |
| 14 | 2-[2-(2-Ethoxy-ethoxy)-ethoxy]-4,6-dichloro-s-triazine | 3-Methyl-5-pyrazolone |
| 15 | 2-Propoxy-4,6-dichloro-s-triazine | 1-(2'-Ethyl-phenyl)-3-methyl-5-pyrazolone |

TABLE 1-continued

| | I<br>Dichloro-s-triazines | II<br>Pyrazolones |
|---|---|---|
| 16 | 2-Isopropoxy-4,6-dichloro-s-triazine | 1-(2',5'-Dichloro-phenyl)-3-methyl-5-pyrazolone |

EXAMPLE 2

The procedure is analogous to that of Example 1, except that 1,4-phenylenediamine-2-sulfonic acid is used as the diazo component in place of 1,3-phenylenediamine-4-sulfonic acid, 2-(2-ethoxy-ethoxy)-4,6-dichloro-s-triazine is used as the acylating agent in place of 2-isopropoxy-4,6-dichloro-s-triazine and equivalent amounts of 1-(2'-chloro-6'-methyl-phenyl)-3-methyl-5-pyrazolone are used in place of 1-(2'-chloro-phenyl)-3-methyl-5-pyrazolone. This yields the azo dye of the formula Further azo dyes which dye wool and polyamide fibres in yellow shades are obtained when the dichloro-s-triazines, the arylenediamines and the pyrazolones listed in column I, column II and column III respectively of the following table are reacted with one another by the indicated processes.

TABLE 2

| | I<br>Dichloro-s-triazines | II<br>Arylenediamines | III<br>Pyrazolones |
|---|---|---|---|
| 1 | 2-Methoxy-4,6-dichloro-s-triazine | 1,4-Phenylenediamine-2-sulfonic acid | 1-(2'-Methyl-6'-ethylphenyl)-3-methyl-5-pyrazolone |
| 2 | 2-Ethoxy-4,6-dichloro-s-triazine | 1,3-Diamino-6-methylbenzene-4-sulfonic acid | 1-(3'-Sulfamoyl-phenyl)-3-methyl-5-pyrazolone |
| 3 | 2-(2-Ethoxy-ethoxy)-4,6-dichloro-s-triazine | 2,5-Diaminobenzoic acid | 1-Phenyl-3-methyl-5-pyrazolone |
| 4 | 2-Isopropoxy-4,6-dichloro-s-triazine | 1,4-Phenylenediamine-2-sulfonic acid | 1-(2'-Chloro-6'-methylphenyl)-3-methyl-5-pyrazolone |
| 5 | 2-Cyclohexyloxy-4,6-dichloro-s-triazine | 1-Amino-3-acetylamino-6-methoxybenzene-4-sulfonic acid (saponified) | 1-(4'-Chlorophenyl)-3-methyl-5-pyrazolone |
| 6 | 2-(2-Hydroxy-ethoxy)-4,6-dichloro-s-triazine | 2,4-Diaminobenzoic acid | 1-(2'-Methylphenyl)-3-methyl-5-pyrazolone |
| 7 | 2-Isopropoxy-4,6-dichloro-s-triazine | 1,4-Diamino-2-methylbenzene | 5-Pyrazolone-3-carboxylic acid |
| 8 | 2-Isopropoxy-4,6-dichloro-s-triazine | 1,3-Diamino-4-chlorobenzene | 1-Phenyl-5-pyrazolone-3-carboxylic acid |
| 9 | 2-(2-Chloro-ethoxy)-4,6-dichloro-s-triazine | 1,3-Diamino-4-ethoxybenzene | 1-Phenyl-5-pyrazolone-3-carboxylic acid |
| 10 | 2-Isopropoxy-4,6-dichloro-s-triazine | 2,6-Diaminonaphthalene | 1-(3'-Sulfophenyl)-3-methyl-5-pyrazolone |
| 11 | 2-Isopropoxy-4,6-dichloro-s-triazine | 1,4-Diamino-2-methoxybenzene | 1-(2',5'-Dichloro-4'-sulfophenyl)-3-methyl-5-pyrazolone |
| 12 | 2-Carboxymethoxy-4,6-dichloro-s-triazine | 1,3-Diaminobenzene | 3-Methyl-5-pyrazolone |
| 13 | 2-(2-Methoxy-ethoxy)-4,6-dichloro-s-triazine | 1,3-Diamino-4-methylbenzene | 1-(3'-Chlorophenyl)-5-pyrazolone-3-carboxylic acid |
| 14 | 2-Isopropoxy-4,6-dichloro-s-triazine | 1,4-Diamino-6-chlorobenzene-2-sulfonic acid | 1-Naphthyl[2']-3-methyl-5-pyrazolone |
| 15 | 2-Methoxy-4,6-dichloro-s-triazine | 1,3-Diaminobenzene | 1-Phenyl-3-sulfomethyl-5-pyrazolone |
| 16 | 2-(1-Methyl-propoxy)-4,6-dichloro-s-triazine | 1-Amino-4-nitrobenzene-2-sulfonic acid (reduced) | 5-Pyrazolone-3-carboxylic acid N-butylamide |
| 17 | 2-Phenoxyethoxy-4,6-dichloro-s-triazine | 1-Amino-4-methoxy-5-amino-methylbenzene-6-sulfonic acid | 1,3-Dimethyl-5-pyrazolone |
| 18 | 2-(2-Acetoxy-ethoxy)-4,6-dichloro-s-triazine | 1-Amino-3-acetylaminobenzene-4-sulfonic acid (saponified) | 1-Phenyl-3-methyl-5-pyrazolone-3-sulfonamide |
| 19 | 2-Isopropoxy-4,6-dichloro-s-triazine | 4-Nitroaniline-2-sulfonic acid (reduced) | 1-(2'-Methylphenyl)-5-pyrazolone-3-carboxamide |

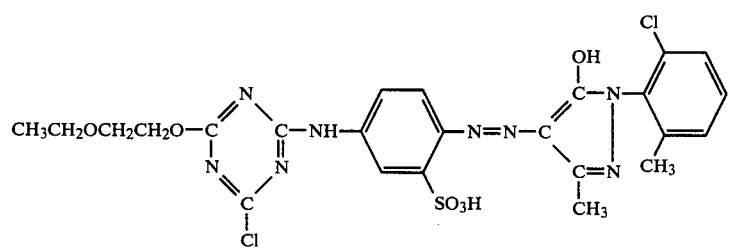

which likewise dyes wool and polyamide fibres in yellow shades.

DYEING EXAMPLE 1

10 parts of wool flannel are put, at 40° C., into a bath which contains 0.5 part of Glauber's salt, 0.4 part by volume of acetic acid and 0.2 part of the dye according to Example 11 in 500 parts of water. The temperature is raised to the boil at a uniform rate in the course of 30 minutes and the wool flannel is dyed for a further one hour at the boil. The dyed material is then rinsed and finished in the conventional manner. A very uniform, bright yellow dyeing is obtained.

When an equal amount of sulfuric acid is used in place of acetic acid and dyeing is carried out as indicated in the example, a yellow dyeing with the same characteristics is obtained.

DYEING EXAMPLE 2

10 parts of a synthetic polyamide fabric are put, at 40° C., into a dyebath which contains 0.40 part of 40% acetic acid, 0.25 part of the sulfonate of butyl ricinoleate and 0.20 part of the dye according to Example 11 in 500 parts of water. The temperature is raised to the boil at a uniform rate in the course of 30 minutes and dyeing is carried out for a further one hour with gentle boiling. The fabric is then rinsed and dried. A uniform, non-streaky yellow dyeing is obtained which has good fastness to washing and to light.

What is claimed is:
1. The azo dye of the formula

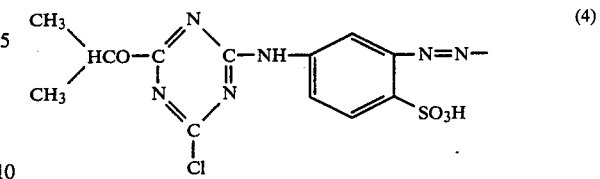

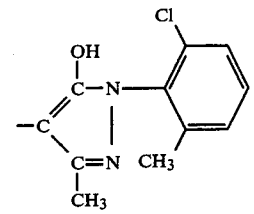

(4)

* * * * *